(12) United States Patent
West et al.

(10) Patent No.: US 11,480,227 B2
(45) Date of Patent: Oct. 25, 2022

(54) ANTI-BACKDRIVE LOCK

(71) Applicant: WEDGEROCK LLC, Limerick, ME (US)

(72) Inventors: Thomas C. West, Standish, ME (US); Emmanuel H. Marsh-Sachs, Sidney, ME (US)

(73) Assignee: WEDGEROCK LLC, Limerick, ME (US)

( * ) Notice: Subject to any disclaimer, the term of this patent is extended or adjusted under 35 U.S.C. 154(b) by 0 days.

(21) Appl. No.: 16/964,586

(22) PCT Filed: Nov. 21, 2018

(86) PCT No.: PCT/US2018/062257
§ 371 (c)(1),
(2) Date: Jul. 23, 2020

(87) PCT Pub. No.: WO2019/147328
PCT Pub. Date: Aug. 1, 2019

(65) Prior Publication Data
US 2021/0041001 A1 Feb. 11, 2021

Related U.S. Application Data

(60) Provisional application No. 62/620,784, filed on Jan. 23, 2018.

(51) Int. Cl.
*F16D 67/02* (2006.01)
*F16D 13/06* (2006.01)
(Continued)

(52) U.S. Cl.
CPC ............. *F16D 67/02* (2013.01); *F16D 13/06* (2013.01); *F16D 41/063* (2013.01); *F16D 59/00* (2013.01);
(Continued)

(58) Field of Classification Search
CPC ........ F16D 13/06; F16D 41/063; F16D 41/10; F16D 43/02; F16D 51/12; F16D 59/00;
(Continued)

(56) References Cited

U.S. PATENT DOCUMENTS 2,224,907 A    12/1940  Gee
3,051,282 A *   8/1962  Greene .................... F16B 1/04
                                                      192/223

(Continued)

FOREIGN PATENT DOCUMENTS

EP        2299105          3/2011

OTHER PUBLICATIONS

International Search Report and Written Opinion in corresponding PCT application, dated May 22, 2019, 8 pp.

*Primary Examiner* — Richard M Lorence
(74) *Attorney, Agent, or Firm* — Caseiro Burke LLC; Chris A. Caseiro

(57) ABSTRACT

A backdrive braking element is provided for preventing backdrive of a shaft. It includes a poly-lobed locking mechanism including an unlock shaft that has a polygon shaped inside profile and is coupled to a poly lock drive and brake assembly. The poly lock drive and brake assembly includes a plurality of poly lock drive and brake segments and is contained within the interior cavity of a housing.

9 Claims, 2 Drawing Sheets

(51) Int. Cl.
*F16D 59/00* (2006.01)
*F16D 41/063* (2006.01)
*B66D 1/14* (2006.01)
*F16H 35/00* (2006.01)

(52) U.S. Cl.
CPC ............ *B66D 1/14* (2013.01); *B66D 2700/03* (2013.01); *F16H 35/00* (2013.01); *F16H 2035/005* (2013.01)

(58) Field of Classification Search
CPC .. F16D 67/02; B66D 1/14; B66D 5/20; F16H 2035/005
USPC ...................................... 192/15, 16, 19, 223
See application file for complete search history.

(56) References Cited

U.S. PATENT DOCUMENTS

| | | | |
|---|---|---|---|
| 3,294,208 A | | 12/1966 | Anderson |
| 3,335,831 A | * | 8/1967 | Kains .................. F16B 1/04 |
| | | | 192/223 |
| 5,355,981 A | | 10/1994 | Toh |
| 6,715,562 B1 | * | 4/2004 | Chen .................. B25F 5/001 |
| | | | 173/176 |
| 2021/0262532 A1 | * | 8/2021 | Toyoda ................ B62D 5/0433 |

* cited by examiner

ANTI-BACKDRIVE LOCK

BACKGROUND OF THE INVENTION

1. Field of the Invention

The present invention relates to an anti-back drive mechanism that may be used with a gear set or other drive train systems with a poly-lobe lock.

2. Description of the Prior Art

The use of gear sets, (two or more gears meshed together) is well known for a variety of applications and in a wide range of devices. Typically, when two or more gears of any type (e.g. spur, planetary, worm) are meshed with one another, each gear in the chain can drive the others in either rotational direction (i.e., clockwise or counterclockwise direction). Depending upon the frictional forces inherent in the gear set, system forces acting on the resting gears may at times cause unwanted movement thereof (in either the clockwise or counterclockwise directions). For example, when a gear set is used with a cable drum to raise a load, it is desired that the load does not drop when power is removed from the input. It is further desired that the load may be lowered by applying a torque in the opposing direction to the input.

Most commonly, an approach to allow the load to be raised and lowered but not dropped is to provide a self-locking gear set; that is, to fabricate a worm and gear set that has a low helix angle, (typically less than 6 degrees), which may be considered self-locking because the frictional forces are greater than the back-driving forces causing them to be self-locking. These systems inherently have low efficiency (less than 35%). In such systems, the normal force acting on the gear times the coefficient of friction results in tangential force that is typically greater than the opposite tangential force caused by the back-driving force. Inefficient gear sets tend to be disadvantageous in that larger power sources are required to operate the device.

In another approach, a power source (e.g. a manual hand wheel or electric motor) can be coupled to a gear set that is further connected to an output, such as a cable drum, for example. When the gear set is a planetary epicyclic gear set, it includes a sun gear, a plurality of planet gears and a ring gear. A planet carrier is coupled to the planetary gears and to the output. The output may be rotated to a desired position by actuation of the power source (e.g., by rotation of a hand wheel) that causes movement of an input shaft, which either turns the sun gear with the ring gear fixed, or it turns the ring gear with the sun gear fixed. In either configuration, the planet gears rotate around the ring gear and the carrier rotates with the planet gears. In certain conditions, a load associated with the output can cause a backdrive of the gear set and, relatedly, the power source. Such backdriving of the gear set and the power source tends to be undesirable for many applications.

Existing apparatuses and mechanisms are known in the art for locking drive trains of various types to minimize or reduce backdrive. The force required to move and prevent the movement of a load can be substantial and so many such gear systems become very large, require substantial energy to actuate and are very expensive. The mechanisms for preventing backdrive of such mechanisms are also correspondingly large, difficult to operate and expensive.

Devices exist that allow transmission torque to be transferred from the input to the output while preventing backdriving. Most of these are limited in the amount of torque they can handle for a given size. Current anti-backdrive devices similar to this (e.g., U.S. Pat. No. 3,335,831) use pins in larger holes so that forward driving torque causes a higher compressive load on transfer blocks/brakes than the output arrangement; therefore, when the drive train is driven forward, it compresses the transfer blocks/brakes and allows motion. When it is back driven, there is no compressive load from the input side and the transfer blocks/brakes expand and push on the housing preventing back driving. This design is undesirable due to the size of the system to handle the required torque because all of the force is transferred through the pins.

It is known that poly lobe, or shape engagement, is a way to couple shafts to transmit the maximum torque load for a given shaft size. What is needed is an apparatus with an effective backdrive braking system that is relatively easy to operate and relatively inexpensive that can transfer large torques as compared to the shaft size. More specifically, there is a need in a wide range of applications for a drive train system that can be driven in one or both directions while preventing the system from being backdriven. An example of such an application is a gear system used to raise a dam gate and hold it in place, allowing the gate to be lowered for normal operation.

SUMMARY OF THE INVENTION

The present invention is an anti-backdrive device used within a drive train which may or may not use gears, that is arranged to transfer torque. The anti-backdrive device is an input brake or clutch mechanism having a polylobed locking mechanism that is capable of being coupled to an input shaft. The device allows bidirectional operation of the input shaft while preventing back driving of that input shaft in both directions. The polylobed locking mechanism includes an annular poly lobed body arranged through a brake shoe to engage and disengage a housing within which the input shaft rotates. The polylobed locking mechanism may be used in many applications for which backdrive prevention is desired and so it is not limited to use with any specific gear apparatus. An example form of gear apparatus is described herein but only for the purpose of providing context for the anti-backdrive device of the invention.

The polylobed locking mechanism of the invention does not use prior geometry of pins in holes to differentiate compression/expansion forces. Instead, it uses the geometry of the polylobes to do so. That is, the out-of-round configuration of the perimeter of the mechanism causes braking wherein the polylobes generate a greater compression force than the expansion force of a driven shaft. Similarly, when the system is back driven, there is nothing holding the input shaft, so expansion forces caused by the back driven output shaft are not compressive and the brakes contact the housing and hold the apparatus from rotating.

The present invention provides an apparatus that enables the rotation of an input shaft to a system clockwise and counterclockwise. The polylobed locking mechanism does not allow an output to be back driven by the force of a load to be maintained in a stationary position when desired. These and other advantages of the present invention will become apparent to those of skill in the art upon review of the following detailed description, the accompanying drawings and the appended claims.

DETAILED DESCRIPTION OF THE INVENTION

Figure 1:
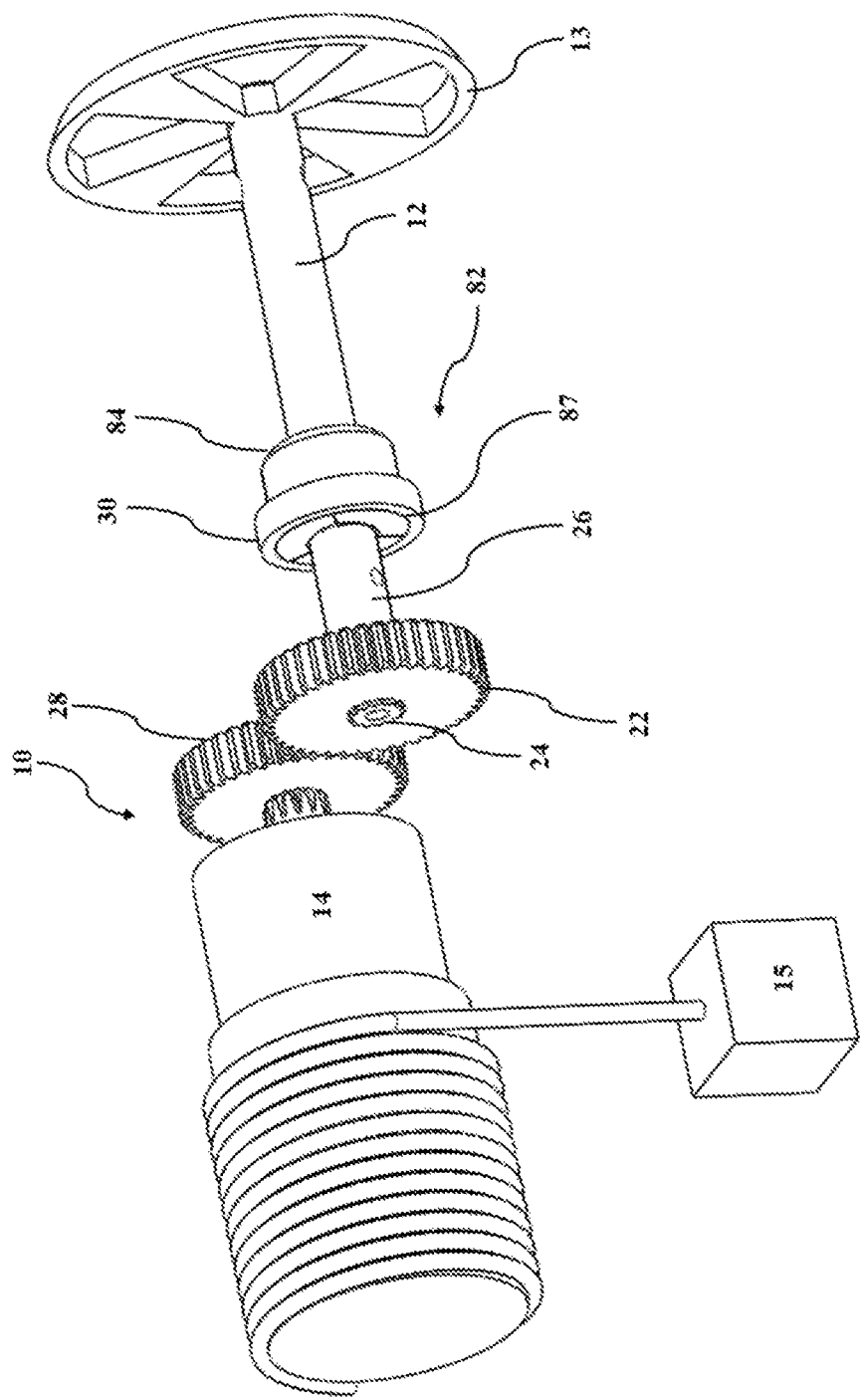
FIG. 1 is top perspective view of a backdrive braking element of the present invention arranged to prevent backdrive of an example gear apparatus.
Figure 2:
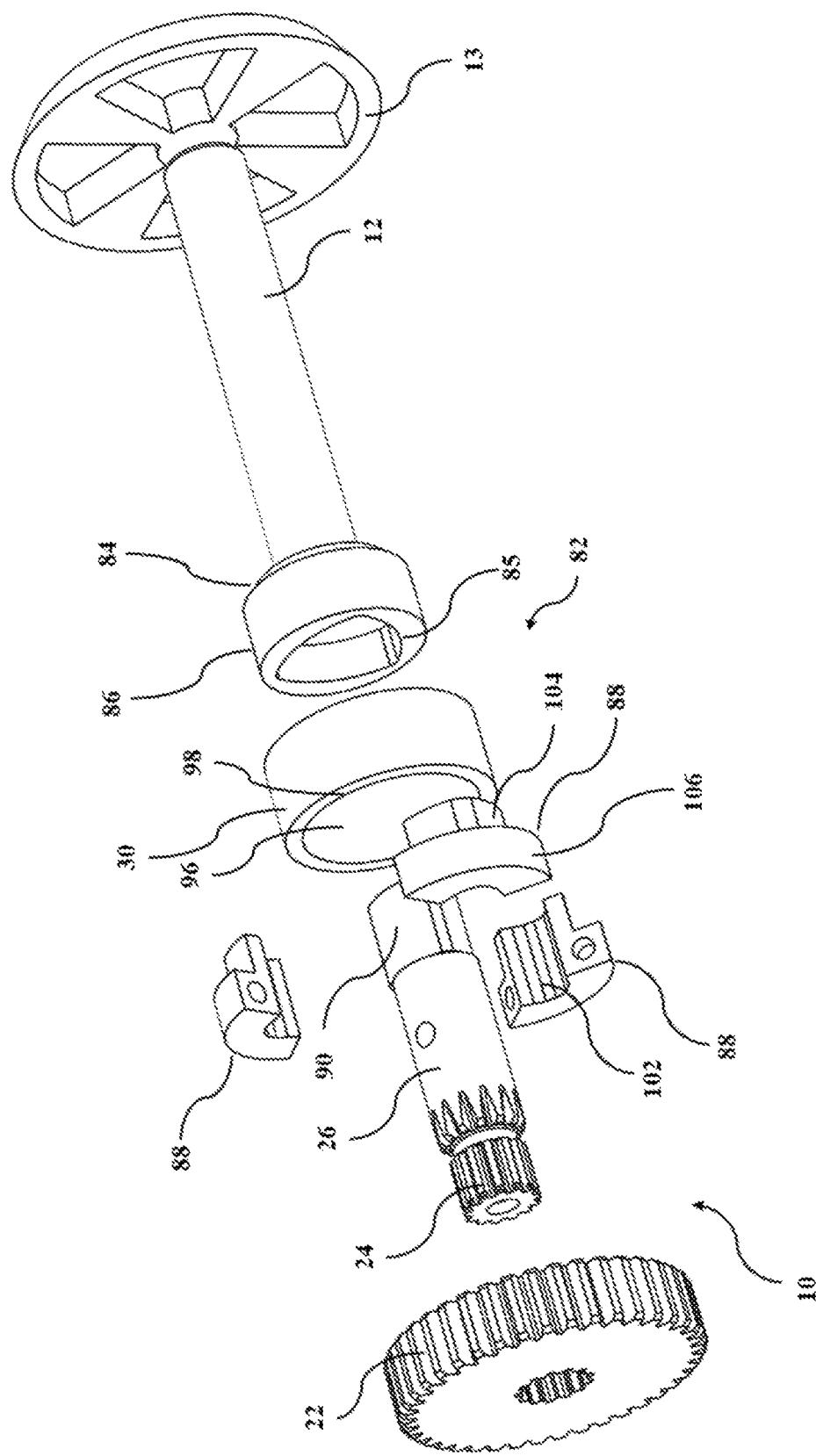
FIG. 2 is an exploded perspective view of the backdrive braking element of FIG. 1.

A backdrive braking element 82 of the present invention is shown in FIGS. 1 and 2 coupled to an input 12 to an output 14 in association with operation of a gear apparatus 10. The gear apparatus 10 includes an input gear assembly 22 and an output gear assembly 28. The input gear assembly 22 is coupled to the input 12, such as an input shaft 12 that can be actuated by a power source 13, such as a wheel or a powered actuator but not limited thereto. The output gear assembly 28 is coupled to the output 14, such as an output shaft 14 that is coupled to a load 15 to be moved, such as a weight on a cable drum but not limited thereto. The input 12 is coupled to the input gear assembly 22 by a spline 24 and an input gear shaft 26. The gear apparatus 10 depicted and briefly described is an example only of the type of device that can be managed for backdrive control by the backdrive braking element 82 of the present invention. Those of skill in the art that the backdrive braking element 82 may be implemented in other drive train operations.

The input gear assembly 22 is further attached to the input shaft 12 through the backdrive braking element 82, which is a poly-lobed locking mechanism. The backdrive braking element 82 includes an unlock shaft 84 coupled to the input shaft 12. The unlock shaft 84 may have an annular outside diameter 86 and has a polygon shaped inside profile 85. The unlock shaft 84 is coupled to a poly lock drive and brake assembly 87, which is made up of a plurality of poly lock drive and brake segments 88. The poly lock drive and brake assembly 87 is contained in a fixed apparatus housing 30 within an interior cavity 96 surrounded by interior walls 98 of the housing 30. Each of the poly lock drive and brake segments 88 has a first end outside profile 104 that engages the inside profile 85 of the unlock shaft 84. A second end outside profile 106 of each poly lock drive and brake segment 88 is arcuate and fits inside the housing 30 and selectively engages and disengages the interior walls 98 of the housing 30. An inside profile 102 of each poly lock drive and brake segment 88 engages a first end profile 90 of input gear shaft 26. The input gear shaft 26 is coupled to the spline 24. The input gear 22 engages the spline 24. It is understood that the input gear 22 and the gear shaft 26 can be made from a single piece. The poly lock drive and brake assembly 87 is shown in the drawings with three poly lock drive and brake segments 88 but there may be two or more such segments or lobes.

When the input device 13 puts a torsional load, clockwise or counterclockwise, into the input shaft 12, it rotates the connected unlock shaft 84 in the same direction. When the inside profile 85 of the unlock shaft 84 contacts the outside profile 104 of the poly lock drive and brake segments 88, it causes them to compress and engage the first end profile 90 of the input gear shaft 26. Once the poly lock drive and brake segments 88 have compressed and fully engaged the first end profile 90 of the input gear shaft 26, the input torsional load is transferred to the input gear shaft 26. There is a corresponding expansion load of the poly lock drive and brake segments 88 caused by the torsional load acting on the first end profile 90 of the input gear shaft 26. The collapsing load caused by the inside profile 85 of the unlock shaft 84 acting on the poly lock drive and brake segments 88 is greater than the expansion load caused by the poly lock drive and brake segments' 88 interaction with the first end profile 90 of the input gear shaft 26. Because the collapsing load is greater, the second end outside profile 106 does not engage the interior walls 98 of the housing 30 and torque is transferred freely from the input shaft 12 to the input gear 22.

When there is a torsional load either clockwise or counterclockwise to the input gear 22 causing a back driving of the drive train, it attempts to rotate the input gear shaft 26. When the first end profile 90 of the input gear shaft 26 engages the poly lock drive and brake segments 88 on their inside profile 102, it causes the poly lock drive and brake segments 88 to expand. Because the unlock shaft 84 is free to rotate, there is no compressing load on the drive and brake segments 88. When the drive and brake segments 88 expand, the outside profile 106 of the poly lock drive and brake segments 88 engage the interior walls 98 of the housing 30 and torque is prevented from being transferred to the input shaft 12.

The invention has been described with respect to certain embodiments that are not intended to be limiting. The scope of the invention is defined by the appended claims and reasonable equivalents of the same.

What is claimed is:

1. A backdrive braking element for preventing backdrive of an input shaft, the backdrive braking element comprising:
    an input gear assembly coupled to the input shaft, wherein the input gear assembly includes an input gear shaft;
    a poly-lobed locking mechanism including an unlock shaft couplable to the input shaft, wherein the poly-lobed locking mechanism is contained in a housing having an interior cavity surrounded by an interior wall,
    wherein the unlock shaft has a polygon shaped inside profile and is coupled to a poly lock drive and brake assembly,
    wherein the poly lock drive and brake assembly includes a plurality of poly lock drive and brake segments and is contained within the interior cavity of the housing, and wherein the poly lock drive and brake segments are configured so that a torsional load applied to the unlock shaft causes a load acting to compress the poly lock drive and brake segments to engage the input gear shaft, and a torsional load applied to the input gear shaft causes a load acting to expand the poly lock drive and brake segments toward engagement with the interior wall of the housing.

2. The backdrive braking element of claim 1 wherein each of the poly lock drive and brake segments has a first end outside profile and a second end outside profile, wherein the first end outside profile engages the polygon shaped inside profile of the unlock shaft.

3. The backdrive braking element of claim 2 wherein the second end outside profile of each of the poly lock drive and brake segments is arcuate and fits inside the housing and selectively engages and disengages the interior wall of the housing.

4. The backdrive braking element of claim 2 wherein an inside profile of each of the poly lock drive and brake segments engages a first end profile of the input gear shaft.

5. The backdrive braking element of claim 1 wherein the poly lock drive and brake assembly is formed of two or more segments or lobes.

6. A backdrive braking element for preventing backdrive of a shaft, the backdrive braking element comprising:
    a poly-lobed locking mechanism including an unlock shaft couplable to the shaft, wherein the poly-lobed locking mechanism is contained in a housing having an interior cavity surrounded by an interior wall, wherein the unlock shaft has a polygon shaped inside profile and is coupled to a poly lock drive and brake assembly, wherein the poly lock drive and brake assembly includes a plurality of poly lock drive and brake segments and is contained within the interior cavity of the housing, and wherein each of the poly lock drive and brake segments has a first end outside profile and a second end outside profile, wherein the first end outside profile engages the polygon shaped inside profile of the unlock shaft.

7. The backdrive braking element of claim 6 wherein the second end outside profile of each of the poly lock drive and brake segments is arcuate and fits inside the housing and selectively engages and disengages the interior wall of the housing.

8. The backdrive braking element of claim 6 wherein an inside profile of each of the poly lock drive and brake segments engages a first end profile of an input gear shaft.

9. The backdrive braking element of claim 6 wherein the poly lock drive and brake assembly is formed of two or more segments or lobes.

* * * * *